Nov. 11, 1969    S. A. LOCK    3,477,667
WINDSHIELD FOR SUPERSONIC AIRCRAFT
Filed July 11, 1967    6 Sheets-Sheet 2
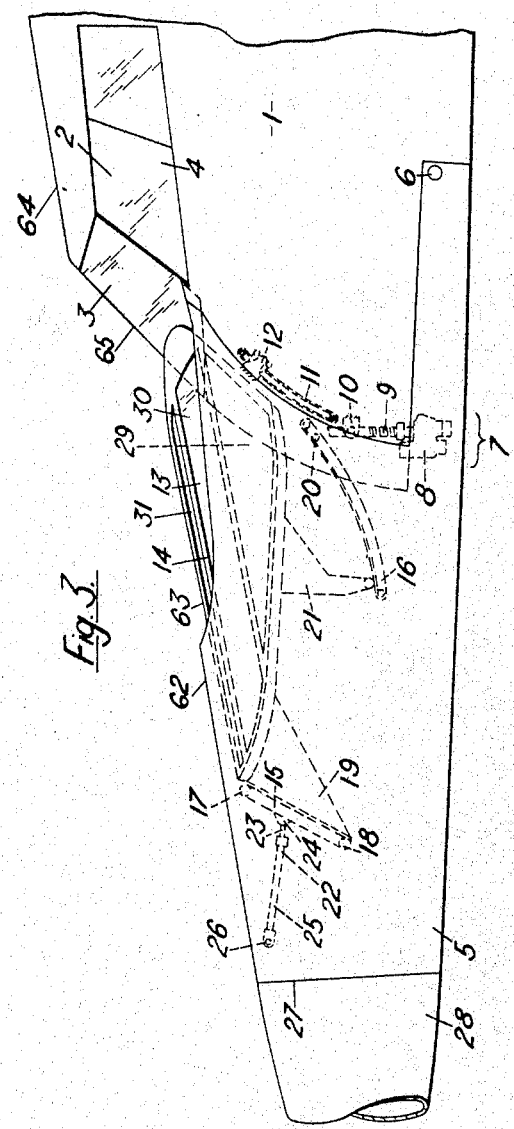
Inventor
Stanley Anthony Lock
By
Bailey, Stephens & Huettig
Attorneys Nov. 11, 1969 S. A. LOCK 3,477,667

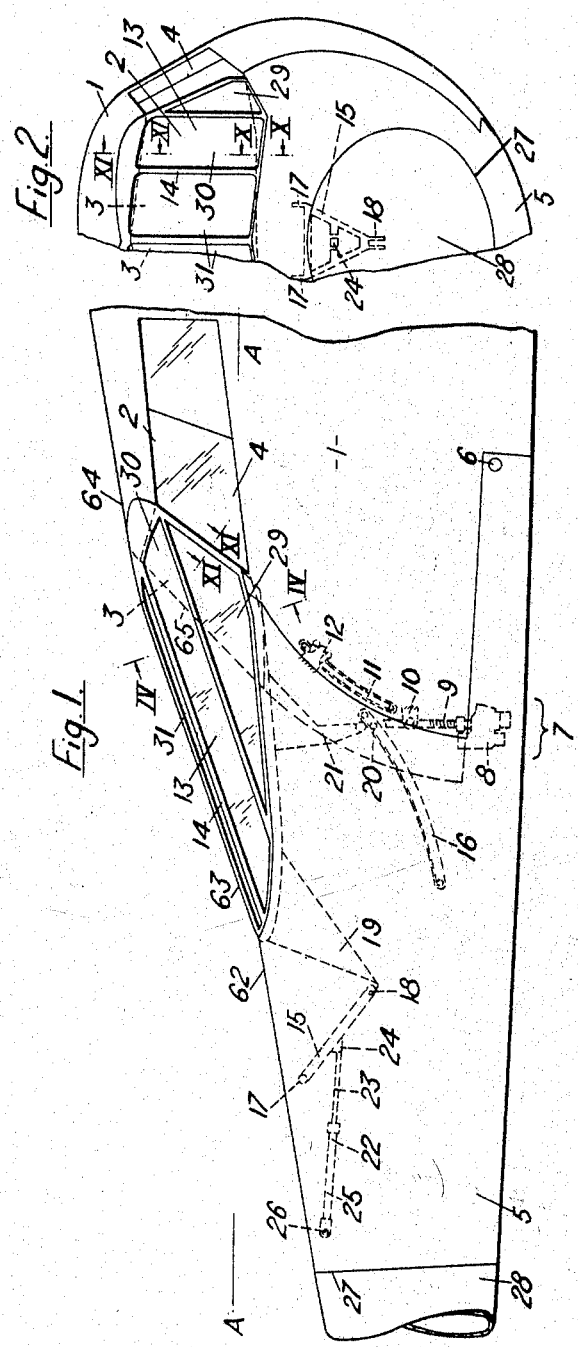

WINDSHIELD FOR SUPERSONIC AIRCRAFT

Filed July 11, 1967 6 Sheets-Sheet 6

Inventor
Stanley Anthony Lock
By
Bailey, Stephens + Huettig
Attorneys

United States Patent Office 3,477,667
Patented Nov. 11, 1969

3,477,667
WINDSHIELD FOR SUPERSONIC AIRCRAFT
Stanley Anthony Lock, Kingswood, Bristol, England, assignor to British Aircraft Corporation (Operating) Limited, London, England, a British company
Filed July 11, 1967, Ser. No. 652,499
Claims priority, application Great Britain, July 29, 1966, 34,123/66
Int. Cl. B64c 1/14, 23/00
U.S. Cl. 244—121                     6 Claims

ABSTRACT OF THE DISCLOSURE

For supersonic flight, an aircraft has a movable shield which in raised window covering position is inclined at an angle between 18° and 22° to the fore-and-aft axis of the aircraft. The drag produced by the inclined shield is economically acceptable.

---

In an aircraft intended to fly at supersonic speeds, it is necessary, for aerodynamic reasons, that substantially all parts of the exterior surface of the fuselage are at no more than a small angle to the fore-and-aft axis of the aircraft. In particularly, a forwardly facing window inclined at a large angle to the axis, for the use of a pilot in an orthodox seated position, cannot be incorporated in the exterior surface without incurring severe drag penalties at supersonic speeds. If a window were provided at too small an angle to the line of forward vision of a pilot, the vision would be so poor, owing to optical effects, such as absorption and internal reflection, as to be of little value. Also, in an aircraft which assumes a high angle of incidence during take-off and landing, the vision of the pilot in a forward and downward direction during these phases of flight would be extremely poor.

According to the present invention, an aircraft has a fuselage towards the front of which is a station for one or more pilots, from which a view is obtainable in a forward direction through a fixed window system inclined at a large angle to the fore-and-aft axis of the aircraft, the fuselage including a nose which extends forwards beyond the fixed window system, and a single shield unit of transparent material which is movable between a lowered position substantially within the nose, and a raised position in which it lies in front of the fixed window system and provides an exterior surface connecting the surface of the nose to the surface of the fuselage aft of the fixed window system, the exterior surface of the shield unit, when seen in side elevation in the raised position, being at least in part inclined to the fore-and-aft axis at an angle which is substantially smaller than that of at least part of the fixed window system, but substantially greater than that of substantially all the nose, and than that of the fuselage aft of the fixed window system.

Preferably the part of the nose forward of the forward edge of the shield has cross sections which have a width substantially greater than their height.

Preferably in side elevation the line of the top of the shield from front to rear is a substantially straight line inclined to the fore-and-aft axis of the aircraft at an angle within the range 18° to 22° when in the fully raised position. Preferably the nose forward of the shield has elliptical cross sections with a major axis to minor axis ratio in the range 1.5 to 1 to 1.1 to 1, the major axis being horizontal.

Preferably the nose is connected to the remainder of the fuselage so that the nose can be tilted to lower its front end for take-off, landing and other manoeuvres at subsonic speeds. In the raised position, suitable for supersonic flight, a line along the top of the nose, from the front to the rear where it meets the shield, as seen in side elevation, is curved and is inclined to the fore-and-aft axis at an angle lying between 12° and 16° near its front end and at an angle lying between 8° and 12° at its rear end. The tilting movement of the nose may be through an angle of between 15° and 20°. Immediately aft of the top boundary of the forward facing fixed window system, a line along the top of the fuselage, as seen in side elevation, is preferably inclined to the fore-and-aft axis at an angle between 8° and 12°.

Preferably the fixed forward facing window system, as seen in side elevation is inclined to the fore-and-aft axis at an angle between 40° and 50°.

The shield may comprise a framework supporting one or more transparent panels and may be shaped to have at least four substantially flat exterior surfaces, two flat surfaces being adjacent and forming an included angle with respect to one another within the range 155° to 165°, and two flat surfaces being disposed one to each side of the said adjacent surfaces and connected thereto in each case by a surface having a single curvature, the imaginary prolongations of the second two flat surfaces forming an included angle with respect to one another within the range 63° to 73°.

Preferably the shield consists of six transparent panels, this number being chosen to facilitate manufacture and to satisfy structural requirements. There are four substantially flat surfaces, each formed by an individual panel, and two surfaces of single curvature each similarly formed.

One embodiment of the invention is illustrated in the accompanying drawings, in which:

FIGURE 1 is a side elevation of the forward end of an aircraft fuselage in a configuration suitable for supersonic flight;

FIGURE 2 is a front view of the aircraft fuselage in the same configuration as FIGURE 1;

FIGURE 3 is the same elevation as FIGURE 1 but with the forward fuselage in a configuration suitable for subsonic flight;

FIGURE 4 is a section on the line IV—IV of FIGURE 1;

Figure 5:
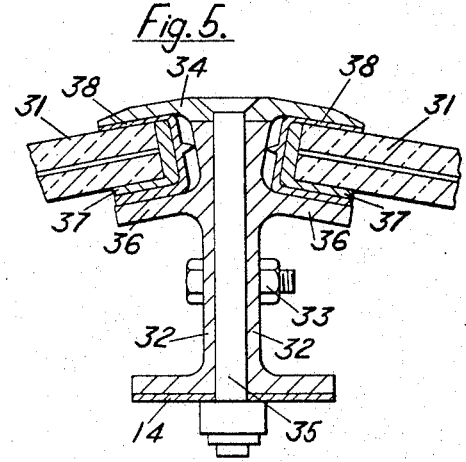
FIGURES 5, 6, 7 and 8 are enlarged views of the parts of FIGURE 4 enclosed in circles, V, VI, VII and VIII respectively.

The aircraft shown has a fuselage 1, near the forward end of which is positioned a crew station 2 having two forwardly-facing windows 3 inclined at a large angle to the fore-and-aft axis A—A of the aircraft. As FIGURES 1 and 3 are side elevations, only one window 3 is visible in these views. Additionally, side windows 4, each of two panels, are provided on each side of the crew station.

Extending forwardly of, and generally lower than, the windows 3 is a nose portion 5. This is pivoted to the fuselage 1 about a horizontal transverse axis 6, and is thus capable of being tilted with its forward end downwards to improve the forward and downward vision through the windows 3. This improved vision is important for take-off and landing especially as some supersonic aircraft assume a high angle of incidence in these phases of flight. In FIGURES 1 and 2 the nose is shown in its raised position in which it provides a minimum of drag for those phases of subsonic and supersonic flight where extensive downward vision is not essential.

The nose portion 5 is tilted about the axis 6 by means of a screw jack system 7, which includes a motor 8, mounted on the nose portion, and a screw 9 which is rotatable by the motor. A nut 10 mounted on the fuselage 1, engages the screw 9 so that on rotation of the screw the nose portion 5 tilts upwards or downwards. Guide tracks are mounted on the fuselage and are engaged by roller units mounted on the nose portion to additionally locate the nose relative to the fuselage. One such guide track is referenced 11 and one such roller unit is referenced 12 in FIGURES 1 and 3.

Immediately forward of the windows 3 the nose portion is locally cut away to accept a transparent shield 13. This shield 13 is movable downwards and forwards into the nose portion to a position in which it substantially uncovers the windows 3, and is movable upwards and rearwards out of the nose portion to a position in which it covers the windows 3. FIGURE 3 illustrates the former position, which is primarily for subsonic flight, and FIGURE 1 illustrates the latter position, which is primarily for supersonic flight. As before described, the nose portion 5 is capable of being lowered to improve the forward and downward vision through the windows 3. The shield 13 is so mounted on the nose portion 5 that when the nose is tilted the shield tilts with it. When the shield 13 is within the nose, downward movement of the nose will, as the shield is tilted with it, further uncover the windows 3. If the shield 13 is in its raised position covering the windows 3 when the nose is lowered, the shield is moved only partially away from the windows, but downward vision is improved sufficiently to aid landing. A safety feature is thus provided should the shield become jammed in the raised position.

The shield 13 comprises a framework 14 to which are attached six sheets of transparent material each formed of glass laminations, either chemically or thermally toughened, with a transparent plastic interlayer. The two sheets 29 and two sheets 31 are substantially flat, but the two sheets 30 have a single curvature as shown in FIGURE 4. The attachment of these sheets will be described in detail with respect to FIGURES 4 to 11.

The shield 13 is movably mounted on the nose portion 5 at three points by means of a link 15 of inverted A shape, and two curved tracks 16, only one of which is shown in FIGURES 1 and 3. The link 15 is pivotally connected at two coaxial points 17 to the nose portion and at a single point 18 to a downward extension 19 of the shield framework 14. The curved tracks 16 are mounted within the nose rearwards of and symmetrically on either side of the link 15, and are engaged by roller units 20 attached to further downward extensions 21 of the shield framework.

The shield 13 is moved with respect to the nose portion 5 by means of a jack 22, the ram 23 of which is connected at 24 to the link 15, and the housing 25 of which is connected at 26 to the nose portion 5. Contraction of the jack 22 draws the point 18 arcuately forwards thereby drawing the shield downwards and forwards into the nose to the position illustrated in FIGURE 3. The jack 22 is provided with a hydraulic lock, not shown, to maintain the shield in its fully raised position, but additionally, a mechanical lock may be provided.

As can be seen from FIGURE 3, the nose portion 5 is not of circular cross section. By way of illustration the joint line 27 between the nose portion and a tapering radome 28 is shown in FIGURES 1, 2 and 3. In FIGURE 2 the joint line is shown to be substantially in the form of an ellipse having its major axis horizontal. The joint line and other sections of the nose forward of the shield 13 are in fact truly elliptical, but because the nose portion, even in the fully raised position, droops with respect to the fore-and-aft axis A—A of the aircraft, the joint line 27 is shown in FIGURE 2 as being somewhat distorted.

The method of attachment of each of the transparent sheets 29, 30, 31 to the framework 14 is illustrated in FIGURES 5, 6, 7 and 8, these figures being enlarged views of certain parts of FIGURE 4. The shield is symmetrical about the aircraft centre line.

FIGURE 5 shows that part of the framework 14 extending along the upper centre line of the shield between the panels 31. This part of the framework comprises two inverted F section members 32 placed back to back and held together by a series of nuts and bolts 33. A capping strip 34 seats upon the F members 32 and is attached thereto by a series of nuts and countersunk head bolts 35 spaced between the nuts and bolts 33. The nuts and bolts 35 retain the edges of the transparent panels 31 between the caping strip 34 and flanges 36 of the members 32. Packing strips 37 and seals 38 are inserted between the transparent panels 31 and the adjacent metal of the framework 14.

Figure 6:
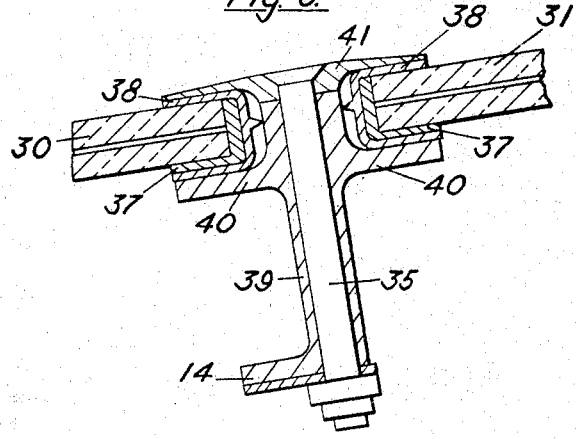

FIGURE 6 shows that part of the framework 14 extending between, and providing a mounting for, the transparent panels 31 and 30. A single member 39 of generally similar section to members 32 but having two flanges 40 has a capping strip 41 attached by means of nuts and bolts 35. These nuts and bolts retain the panels 31 and 30 between the capping strip 41 and the respective flanges 40 of the member 39. As described with respect to FIGURE 5, strips 37 and seals 38 are inserted between the capping strips 41 and the flanges 40 and the sheets 30, 31.

Figure 7:
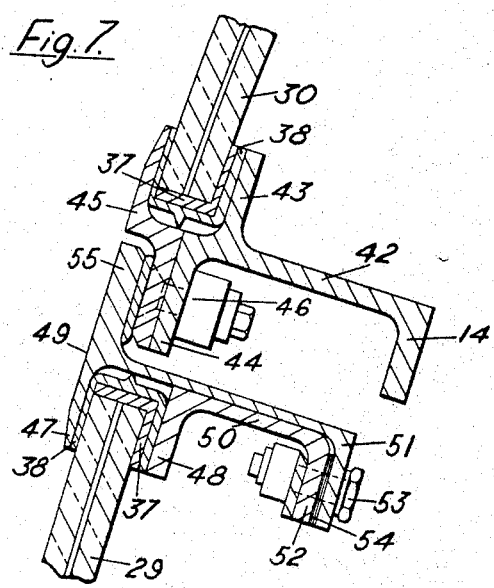
Figure 8:
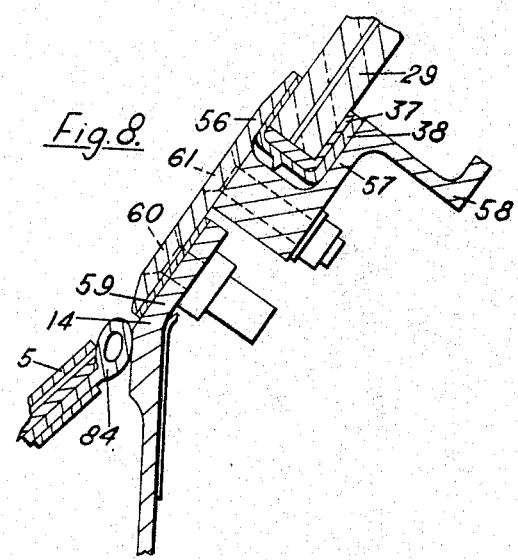

FIGURES 7 and 8 show how the portions of framework 14, on which the transparent panel 29 is mounted, are adapted so that this panel, together with parts of the framework, is detachable from the shield without requiring dis-assembly of the capping strips, packing strips and seals.

Referring firstly to FIGURE 7, a member 42 has a flange 43, against which the panel 30 is located, and a flange 44 to which a capping strip 45, of joggled section, is attached. A nut and countersunk bolt 46 retain the panel 30 between the capping strip 45 and the flange 43. Again a strip 37 and a seal 38 are provided between the capping strip 45, the flange 43 and the transparent panel 30.

The edge of the panel 29, shown in FIGURE 7, is located between the flanges 47 and 48 of members 49, 50, respectively. The members 49 and 50 are of U section, and are arranged so that the member 50 lies within the channel of the member 49. Their adjacent flanges 51 and 52 are connected by means of nuts and bolts 53 and are suitably spaced by shims 54 so as to retain the panel 29 in place. A packing strip 37 and a seal 38 are inserted between the flanges 47, 48 and the transparent panel 29.

The member 49 has a further flange 55 extending in the same plane as the flange 47. When positioned on the shield, this flange lies adjacent to the joggled portion of the capping strip 45, and is connected thereto and to the flange 44 nuts and bolts (not shown) which alternate with the nuts and bolts 46.

Referring now to FIGURE 8, the edge of the transparent panel 29 shown therein is gripped between a capping strip 56 and a face 57 of a member 58. The panel 29 is held in position by a series of countersunk bolts 61 (together with nuts) which pass right through the capping strip 56 and the member 58. A packing strip 37 and a seal 38 are provided adjacent to the panel 29. The capping strip 56 is of sufficient width to overlay a recessed portion 59 of the framework 14 at the edge of the shield, and in use is connected thereto by means of nuts and countersunk bolts 60.

Figure 11:
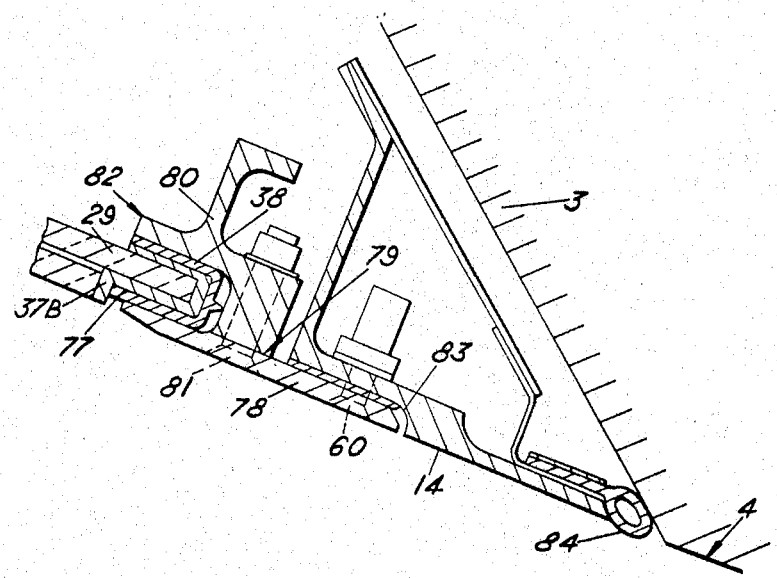

In this manner the unit comprising the transparent panel 29, capping strip 56, member 58, members 50 and 51, and adjacent framework, which will be referred to in respect of FIGURE 11, can be removed from the shield without dis-assembly by merely removing a series of bolts.

Figure 9:
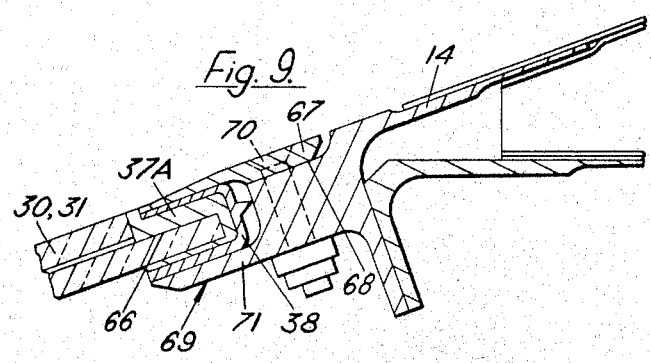
FIGURES 9, 10 and 11 are enlarged sections taken about the lines IX—IX, X—X of FIGURE 2, and the line XI—XI of FIGURE 1, respectively.

FIGURE 9 is a section of the aft edges of transparent panels 30, showing the adjacent framework 14, and the means of attachment of the panels thereto. A section of the aft edges of the transparent panels 31 and their adjacent framework is similar.

To minimize exterior surface discontinuity when attached to the shield, the aft edges of the panels 30 are relieved at 66 to approximately half normal thickness This enables a capping strip 67 to lie substantially flush with the shield exterior surface when inset into a relieved portion 68 of a member 69. Bolts 70, having countersunk heads pass through the capping strip 67 and the member 69 to cooperate with nuts and thereby retain the aft edge of the panel 30 between the capping strip and a flange 71 on the member 69. Packing strips 37A and seals 38 are inserted between the panel 30, the adjacent surfaces of the capping strip 67 and the flange 71.

Figure 10:
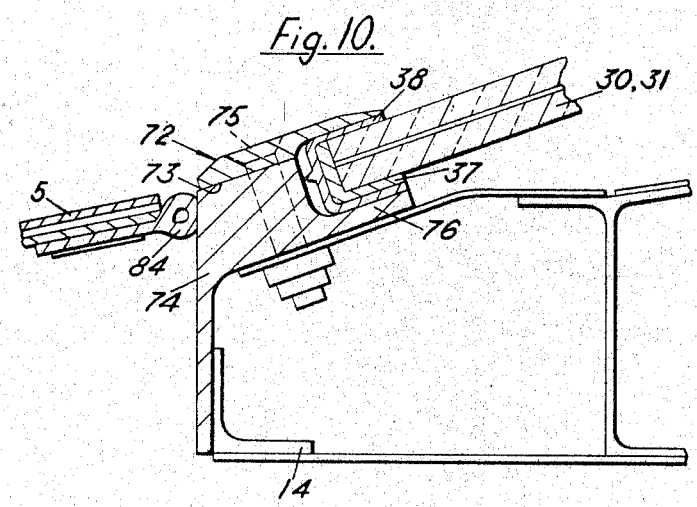

FIGURE 10 is a section of the forward edges of the transparent panels 30 showing the attachment of these forward edges to the framework 14. The attachment of the forward edges of the panels 31 is similar. A capping strip 72 mates with a face 73 of a member 74 of the framework and is connected thereto by a series of nuts and countersunk head bolts 75. The panel 30 is thus retained between the capping strip 72 and a flange 76 of the member 74. Packing strips 37 and seals 38 are inserted between the transparent panel, the capping strip 72 and the flange 76.

FIGURE 11 shows a section of the aft edges of the transparent panels 29. It will be recalled that these panels are adapted to be removable as a unit with their immediately adjacent framework without the necessity of disammebling their associated seals and packing strips.

As with the aft edges of the panels 30 and 31, the aft edges of panels 29 are relieved at 77 at approximately half normal thickness, again to minimize exterior surface discontinuity of the shield. A capping strip 78 mates with a surface 79 on a member 80 and is attached thereto by means of a series of nuts and countersunk headed bolts 81. The panel 29 is thus retained between the capping strip 78 and a flange 82 of the member 80. Packing strips 37B and seals 38 are inserted between the panel 29, the capping strip 78 and the flange 82.

The capping strip 78 is of sufficient width to overlap a recessed portion 83 of the framework 14 at the edge of the shield, and in use is connected thereto by means of nuts and conutersunk bolts 60.

FIGURES 8, 10 and 11 also show the sealing arrangement between the side edges of the shield and the nose portion 5, the forward edges of the shield and the nose portion 5, and the aft edges of the shield and the forward facing windows 3, 4 respectively. In each case sealing is achieved by means of resilient sealing strips 84 of generally O section with a laterally extending strip for attachment to the adjacent structure. In the cases of FIGURES 8 and 10 the sealing strip 84 is attached to the nose portion 5 and in the case of FIGURE 11 the sealing strip is attached to the shield. When the shield is in its raised position, as illustrated in these figures, the sealing strips 84 are slightly deformed when compressed between the adjacent structural members to give a substantially fluid-tight and dust-proof seal.

Referring again to FIGURES 1 and 3, the line 62 of the top of the nose portion 5 immediately forward of the shield 13 in its raised position is at 10° to the aircraft fore-and-aft axis A—A, the line 63 of the top of the shield 13 is at 20°, and the line 64 of the top of the fuselage immediately aft of the forwardly facing windows 3 is at 10°. A line 65 drawn between the two forward facing windows 3 is inclined at 45° to the fore-and-aft axis A—A of the aircraft. Each of these lines for which angles are quoted are in the central vertical plane of the aircraft.

Referring to FIGURE 4 the transparent sheets 31 are mounted at an included angle of 160° to one another and the transparent sheets 29 are mounted so that their imaginary prolongations meet at an included angle of 68° to one another.

To give scale to the embodiment illustrated, the shield has a top centre line length of 88 inches and extends to rear corners which lie 10 inches aft of the rear end of the top centre line.

In an alternative shield, the six transparent panels illustrated, may be reduced to a total of four panels by forming the panels 30 and 31, mounted on either side of the central vertical plane of the aircraft, into single large panels. In this alternative the structure illustrated in FIGURE 6 would be deleted.

I claim:

1. An aircraft having a fuselage with a fore-and-aft axis, the fuselage including a station for at least one pilot towards the front of said fuselage, a fixed window system inclined at a large angle to the fore-and-aft axis and providing for a view in a forward direction for said station, a nose which extends forward beyond the fixed window system, a single shield unit of transparent material, and means operable to move the shield between a lowered position substantially within the nose, and a raised position in which it lies in front of the fixed window system and provides an exterior surface connecting a surface portion of the nose to a surface portion of the fuselage aft of the fixed window system, and when said shield is in said raised position for supersonic flight and seen in side elevation, a line along the top of said nose, from the front to its rear end where it meets said shield, is inclined to said fore-and-aft axis at an angle between 8° and 12° at its rear end, a line along the top of said shield from front to rear is substantially straight and is inclined to said fore-and-aft axis at an angle between 18° and 22°, and a line along the top of said fuselage immediately aft of the top boundary of said forward facing fixed window system in inclined to said fore-and-aft axis at an angle between 8° and 12°.

2. An aircraft according to claim 1, having means mounting said shield on said nose, means mounting said nose for movement with respect to said fuselage about a transverse horizontal axis, and means operable to move said nose about said horizontal axis.

3. An aircraft according to claim 2, in which said means mounting said shield on said nose comprises a pivoted link and at least one roller unit cooperating with a curved track.

4. An aircraft according to claim 1, in which said nose forward of the forward edge of said shield has cross sections which have a width substantially greater than their height.

5. An aircraft according to claim 4, in which said cross sections of said nose are elliptical with a major axis to minor axis ratio in the range 1.5 to 1 to 1.1 to 1.

6. An aircraft according to claim 1, in which said forward facing fixed window system, as seen in side elevation, is inclined at an angle between 40° and 50° to said fore-and-aft axis.

References Cited

UNITED STATES PATENTS

| | | | |
|---|---|---|---|
| 2,808,355 | 10/1957 | Christie et al. | 154—2.71 |
| 3,114,526 | 12/1963 | Morgan | 244—121 X |
| 3,261,575 | 7/1966 | Lock et al. | 244—121 X |
| 3,331,570 | 7/1967 | Kinnerly | 244—121 |
| 3,334,846 | 8/1967 | Spivak et al. | 244—121 |

MILTON BUCHLER, Primary Examiner

T. W. BUCKMAN, Assistant Examiner

U.S. Cl. X.R.

244—131